United States Patent [19]

Suzuki et al.

[11] Patent Number: 4,896,946
[45] Date of Patent: Jan. 30, 1990

[54] LIQUID CRYSTAL DISPLAY DEVICE

[75] Inventors: Takumi Suzuki, Tokyo; Kiyohiro Uehara; Ryo Niitsuma, both of Kanagawa, all of Japan

[73] Assignee: Ricoh Company, Ltd., Tokyo, Japan

[21] Appl. No.: 277,500

[22] Filed: Nov. 30, 1988

Related U.S. Application Data

[63] Continuation of Ser. No. 857,191, Apr. 29, 1986, abandoned.

[30] Foreign Application Priority Data

| May 13, 1985 | [JP] | Japan | 60-069385[U] |
| May 14, 1985 | [JP] | Japan | 60-070116[U] |
| May 22, 1985 | [JP] | Japan | 60-108241 |
| May 22, 1985 | [JP] | Japan | 60-108242 |

[51] Int. Cl.$^4$ .......................................... G02F 1/133
[52] U.S. Cl. .................................. 350/336; 350/334; 350/343; 350/344
[58] Field of Search ............... 350/334, 331 R, 344, 350/343, 336; 439/66, 86, 91

[56] References Cited

U.S. PATENT DOCUMENTS

| 3,998,513 | 12/1976 | Kobayashi et al. | 439/91 |
| 4,130,408 | 12/1978 | Crossland et al. | 350/344 |
| 4,158,485 | 6/1979 | Mueller et al. | 350/344 |
| 4,228,574 | 10/1980 | Culley et al. | 350/331 R |
| 4,549,174 | 10/1985 | Funada et al. | 350/336 |
| 4,655,551 | 4/1987 | Washizuka et al. | 350/334 |

FOREIGN PATENT DOCUMENTS

| 2407738 | 8/1974 | Fed. Rep. of Germany | 350/334 |
| 0069186 | 5/1980 | Japan | 350/336 |
| 0147721 | 8/1985 | Japan | 350/334 |

OTHER PUBLICATIONS

Harris et al., "Liquid Crystal Display and Touch Panel Keyboard Input", IBM Disclosure Bulletin, vol. 24, No. 4, Sep. 1988, pp. 1888–1890.

*Primary Examiner*—Stanley D. Miller
*Assistant Examiner*—Anita Pellman Gross
*Attorney, Agent, or Firm*—Oblon, Spivak, McClelland, Maier & Neustadt

[57] ABSTRACT

A liquid crystal display device having a circuit board and a liquid crystal display cell mounted on the circuit board. The liquid crystal display cell includes substrates each formed of a flexible film. The liquid crystal display cell has an electrode terminal section, and the circuit board has an outer electrode terminal section connected by a connector to the electrode terminal section of the liquid crystal display cell. The connector comprises a film of anisotropic electric conductivity which serves to electrically interconnect the electrode terminal section of the liquid crystal cell and the outer electrode terminal section of the circuit board and also to mechanically secure the liquid crystal display cell to the circuit board.

1 Claim, 8 Drawing Sheets

LIQUID CRYSTAL DISPLAY DEVICE

This application is a continuation of application Ser. No. 857,191, filed on Apr. 29, 1986, now abandoned.

BACKGROUND OF THE INVENTION

1. Field of the Invention

The present invention relates to a liquid crystal display device, and more particularly to a liquid crystal display device including a liquid crystal display cell having a flexible film used as a substrate and mounted on a circuit board.

2. Discussion of Background

There are known liquid crystal display cells employing a flexible plastic film as a substrate on which transparent electrodes are formed. Since the liquid crystal display cells of this type are inherently lightweight and low in profile, it is preferable that they should be mounted such that the resulting liquid crystal display device will also be lightweight and low in profile. Conventional structures designed for mounting those liquid crystal display cells which employ glass substrates have proven unsatisfactory in mounting lightweight and low-profile liquid crystal display cells. For example, one known mounting arrangement uses a connector of anisotropic electric conductivity which is incapable of bonding a liquid crystal display cell and a printed-circuit board. With such a mounting construction, the liquid crystal display cell is connected and fixed in place such as by holding the connector with a holder such as a metal fastener. Since the metal fastener is large and heavy, the resulting liquid crystal display assembly cannot be low in profile and light in weight.

SUMMARY OF THE INVENTION

Therefore, it is an object of the present invention to provide a liquid crystal display device including a liquid crystal display cell having a flexible film used as a substrate, the liquid crystal display cell being mounted on a circuit board through a low-profile, simple, and lightweight connecting arrangement.

According to the present invention, there is provided a liquid crystal display device comprising a circuit board having an outer electrode terminal section, a liquid crystal display cell including a flexible film used as a substrate and having an electrode terminal section, and a film connector of anisotropic electric conductivity interconnecting the electrode terminal section of the liquid crystal display cell and the outer electrode terminal section of the circuit board, whereby the electrode terminal section and the outer electrode terminal section are electrically interconnected and the liquid crystal cell is mechanically secured to the circuit board.

The electrode terminal section of the liquid crystal display cell is mounted on a projecting edge of a cell substrate which extends outwardly from a display area thereof. Transparent electrodes extend from the display area of the cell substrate toward the projecting edge, the transparent electrodes on the projecting edge constituting the electrode terminal section.

It is necessary to connect the electrode terminal section and the outer electrode terminal section with the film connector so that the liquid crystal display cell will not be distorted, the gap in the cell will not be impaired, and the electrodes will not be ruptured.

Where the liquid crystal display device has a transparent touch sensor panel on the liquid crystal display cell, an electrode terminal section of the transparent touch sensor panel is connected to the outer electrode terminal section of the circuit board also by a film connector of anisotropic electric conductivity.

Since the electrode terminal section of the liquid crystal display cell and the outer electrode terminal section of the circuit board are electrically connected by the film connector of anisotropic electric conductivity, and the liquid crystal cell is fixedly mounted on the circuit board also by the film connector, the assembled device is low in profile producing an advantage resulting from the liquid crystal display cell using the flexible-film substrate. Furthermore, the mounting operation is simple which allows the liquid crystal display device to be manufactured inexpensively.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
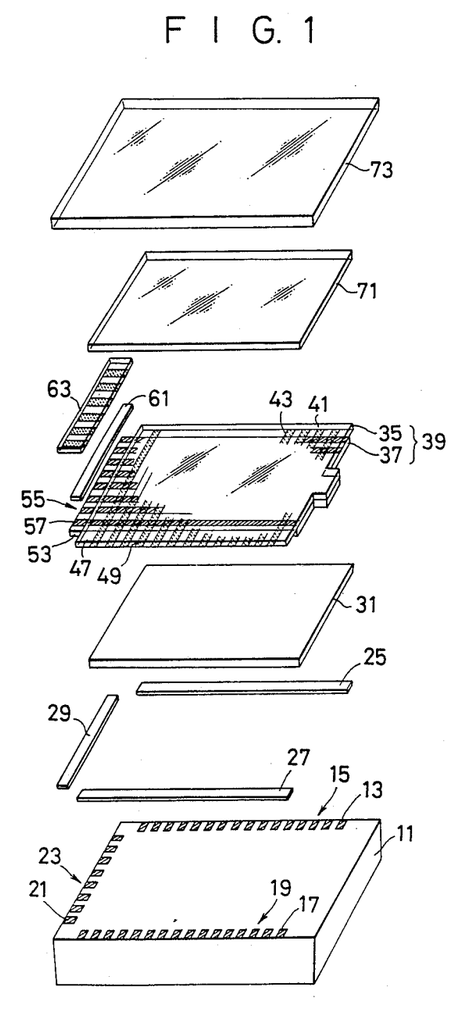
FIG. 1 is an exploded perspective view of a liquid crystal display device according to an embodiment of the present invention.

Referring now to the drawings, wherein like reference numerals designate identical or corresponding parts throughout the several views, and more particularly to FIG. 1 thereof, which illustrates a liquid crystal display device according to an embodiment of the present invention. The liquid crystal display device generally comprises a printed-circuit board 11, a reflecting polarizer 31, a liquid crystal cell 39, a polarizer 71, and a protective panel 73. The liquid crystal display cell 39 is composed of an upper substrate 35 and a lower substrate 37. The upper substrate 35 have opposite projecting edges 41, 47 extending outwardly from a display area and including first and second signal electrode terminal sections 43, 49, respectively, on the lower surfaces thereof. The lower substrate 37 also has a projecting edge 53 including a scanning electrode terminal section 55 on the upper surface thereof. The printed-circuit board 11 has outer signal electrode terminal sections 15, 19 connected respectively to the first and second signal electrode terminal sections 43, 49 of the liquid crystal display cell 39 by heat-sealable film connectors 25, 27 of anisotropic electric conductivity. The printed-circuit board 11 also has an outer scanning electrode terminal section 23 connected to the scanning electrode terminal section 55 of the liquid crystal display cell 39 by heat-sealable film connectors 29, 61 of anisotropic electric conductivity through a flexible substrate 63 having conductive electrodes 65 (FIGS. 5 and 6) spaced at pitches equal to those of scanning lines.

Figure 2:
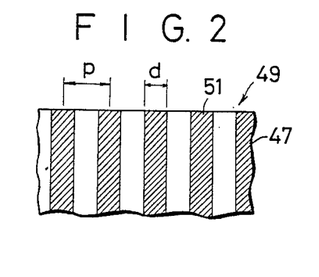
FIG. 2 is an enlarged fragmentary bottom view of an electrode terminal section on a projecting edge of an upper substrate of a liquid crystal display cell.

The projecting edge 47 of the liquid crystal display cell 39 is fragmentarily shown in FIG. 2. Transparent signal electrodes 51 are formed as of ITO and patterned on the underside of the projecting edge 47, the electrodes 51 being spaced at pitches p and each having a width d. The signal electrodes 51 constitute the electrode terminal section 49.

Figure 3:
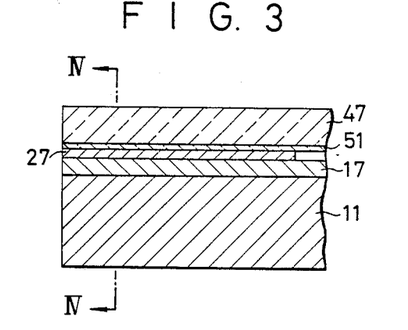
FIGS. 3 through 7 are fragmentary cross-sectional views showing the manner in which a liquid crystal display cell and a circuit board are connected together.
Figure 4:
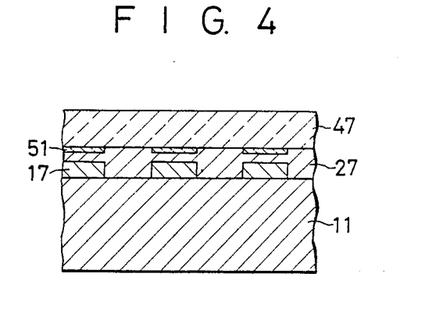

FIG. 3 fragmentarily shows in cross section the manner in which the second signal electrode terminal section 49 and the outer signal electrode terminal section 19 are interconnected. FIG. 4 is a cross-sectional view taken along line IV—IV of FIG. 3. For assembly, the heat-sealable film connector 27 is placed on the outer signal electrode terminal section 19, and the projecting edge 47 is placed on the film connector 27 with the signal electrodes 51 aligned with outer signal electrodes 17 of the outer signal electrode terminal section 19. Then, the assembly is pressed downwardly by a heater (not shown) to secure the signal electrode terminal section 49 to the printed-circuit board 11. At this time, the film connector 27 is pressed to a reduced thickness between the signal electrodes 51 and the outer signal electrodes 17 to keep these signal electrodes 51, 17 in electric contact with each other. The heat-sealable film connector 27 is formed by dispersing electrically conductive particles into a film. It is anisotropic in electric conductivity since the pressed areas of reduced thickness exhibit higher electric conductivity than other area. The resulting assembly is thin or low in profile because the film of anisotropic electric conductivity can be thinner than the lower substrate 37 and the reflecting polarizer 31. At the same time that the signal electrodes 17, 51 are electrically connected by the film, the liquid crystal display cell 39 is fixed to the printed-circuit board 11. As a result, the mounting operation is simplified. Inasmuch as a liquid crystal cell employing a flexible plastic film as a substrate is light in weight, it can well be fixed in place by a heat-sealable film.

Figure 5:
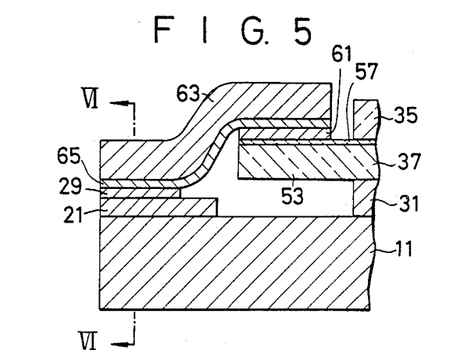
Figure 6:
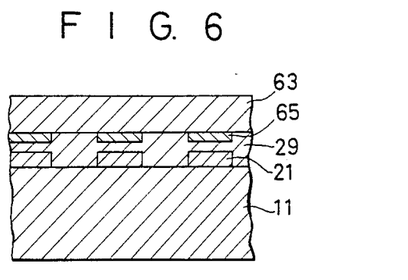

FIG. 5 cross-sectionally shows the manner in which the scanning electrode terminal section 55 and the outer scanning electrode terminal section 23 are interconnected, and FIG. 6 is a cross-sectional view taken along line VI—VI of FIG. 5. Since scanning electrodes 57 of the scanning electrode terminal section 55 and outer scanning electrodes 21 of the outer scanning electrode terminal section 23 face upwardly (FIG. 1), they could not be interconnected directly. They are interconnected through the flexible printed substrate 63 having the conductive electrodes 65. The flexible printed substrate 63 and the scanning electrode terminal section 55, and the flexible printed substrate 63 and the outer scanning electrode terminal section 23 are interconnected by the heat-sealable film connectors 29, 61, respectively, in the same manner as described with reference to FIGS. 3 and 4. The heat-sealable film connectors 29, 61 serve both to electrically interconnect the liquid crystal cell 39 and the printed-circuit board 11 and to mechanically secure the liquid crystal cell 39 and the printed-circuit board 11 to each other. The surface of the outer scanning electrode terminal section 23 of the printed-circuit board 11 and the surface of the scanning electrode terminal section 55 of the liquid crystal cell 39 are at different levels due to the thicknesses of the substrate and the polarizer. However, these surfaces of different heights can reliably be electrically connected together by the flexible printed substrate 63.

While in the foregoing embodiment the opposite edges of the liquid crystal display cell are heat-sealed to the printed-circuit board through the first and second signal electrode terminal sections, the liquid crystal display cell may be fixed to the printed-circuit board through a single signal electrode terminal section. Furthermore, the liquid crystal display cell may be secured to the printed-circuit board through either the signal electrode terminal section(s) or the scanning electrode terminal section. The liquid crystal display cell can more securely be fixed to the printed-circuit board through both the signal electrode terminal section(s) and the scanning electrode terminal section.

The protective panel 73 is preferably made of a rigid material such as acrylic sheet. The protective panel 73 is fixed to the printed-circuit board 11 by screws or bonding or other suitable means. Where a protective panel having a polarizing capability is employed, the polarizer 71 may be dispensed with. A liquid crystal cell employing a plastic film is susceptible to damage under external stresses or shearing forces. With the protective panel attached, however, the entire assembly or module can easily be handled and the surface of the liquid crystal cell is protected against damage.

The polarizer 71 and the reflecting polarizer 31 may not be fixed with respect to the liquid crystal cell 39 and the protective panel 73. A reflecting plate and a polarizer may be employed in place of the reflecting polarizer 31.

Figure 7:
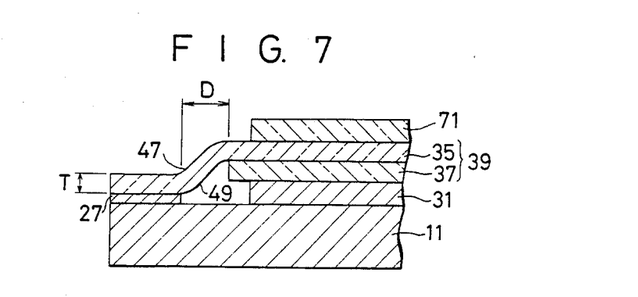

FIG. 7 is a cross-sectional view of the arrangement in which the liquid crystal cell 39 and the printed-circuit board 11 are connected to each other. The signal electrodes 51 and the outer signal electrodes 17 are omitted from illustration since they are much thinner than the reflecting polarizer 31 and the lower substrate 37. The lower substrate 37 and the reflecting polarizer 31 underlie the upper substrate 35. Therefore, the upper substrate 35 which is formed of a flexible film has its edge flexing downwardly and fixed to the printed-circuit board 11 by the film connector 27. Generally, each of the upper substrate 35, the lower substrate 37, and the reflecting polarizer 31 is of a thickness in the range of from a few tens micrometers to a few hundreds micrometers, and the film connector 27 comprises a film having a thickness of about 10 micrometers.

The flexible upper substrate 35 can easily be coupled by the film connector 27 to the printed-circuit board 11. However, since the upper substrate 35 is fixed as it is in the flexed condition, it is stretched when heat-sealed and so are the signal electrodes 51. If the upper substrate 35 were excessively flexed, then the transparent signal electrodes 51 would be subjected to rupture upon elongation. To prevent such electrode breakage, the thickness T of the upper substrate 35 and the horizontal distance D between the fixed film connector 27 and the edge of the lower substrate 37 should be of the following relationship:

D>T

The signal electrodes 51 on the upper substrate 35 can more reliably be prevented from rupture by selecting the distance D to be 500 micrometers or greater since the signal electrodes 51 might be subject to localized stresses due for example to burrs on the edge of the lower substrate 37.

An example will be described below.

Transparent signal electrodes (indicated at 51 in FIG. 2) were formed by sputtering ITO to an average thickness of 450 angstrom on a substrate of polyester film having a thickness of 100 micrometers and then by patterning the sputtered layer at pitches (p) and electrode widths (d =p/2) as shown in Table 1 below. Two of the substrate thus prepared were used as upper and lower substrates each having a thickness T=100 micrometers, and a liquid crystal cell was constructed using the upper and lower substrates. A reflecting polarizer having a thickness of 250 micrometers was placed on a printed-circuit board, and the liquid crystal cell was mounted on the reflecting polarizer, as shown in FIG. 1. Each of employed film connectors of anisotropic electric conductivity had a thickness of 15 micrometers and was made of a film known as Anisoron manufactured by Hitachi, Ltd.

Liquid crystal cells were mounted on printed-circuit boards with different horizontal distances D between the fixed film connector and the edge of the lower substrate. Electric conduction tests were conducted on 256 electrodes for each of the liquid crystal cells, and the test results are given as follows in Table 1:

TABLE 1

| Distance D (mm) | Failures out of 256 electrodes | | |
|---|---|---|---|
| | Pitch p (mm) | | |
| | 0.5 | 0.8 | 1.2 |
| 0.05 | 256 | 256 | 256 |
| 0.1 | 146 | 82 | 30 |
| 0.3 | 12 | 3 | 0 |
| 0.5 | 0 | 0 | 0 |
| 0.7 | 0 | 0 | 0 |

Figure 8:
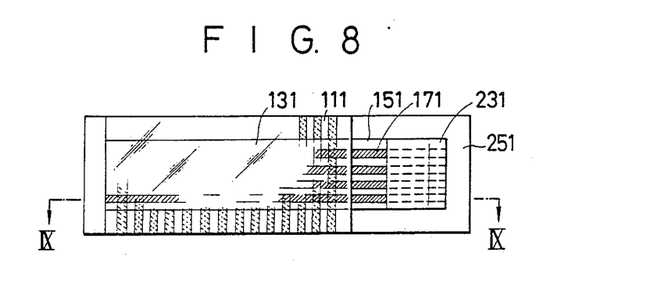
FIGS. 8 and 9 are views explaining the problem of distortion of a liquid crystal display cell.
Figure 9:
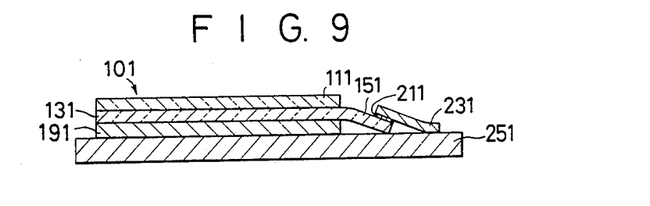

FIG. 8 shows in plan a liquid crystal display device comprising a liquid crystal display panel or cell having upper and lower substrates 111, 131 each made of a flexible plastic film, and a printed-circuit board 251 to which the liquid crystal display panel is connected by heat-sealable connectors 211 (FIG. 9). FIG. 9 is a cross-sectional view taken along line IX—IX of FIG. 8. The lower substrate 131 has an electrode terminal section 171 on the upper surface of a projecting edge 151 of the lower substrate 131. The electrode terminal section 171 is connected to an electrode terminal section on the upper surface of the printed-circuit board 251 through a bridging flexible printed substrate 231. The electrode terminal section 151 is connected to an electrode terminal section on the flexible printed substrate 231 by a heat-sealable connector 211 upon downward application of heat and pressure. The projecting edge 151 of the lower substrate 131 floats since a member 191 such as a polarizer, a reflecting plate, or a light source underlie the lower substrate 131. Since the lower substrate 131 is flexible, the projecting edge 151 is flexed by being pushed downwardly and fixed in the flexed condition as shown in FIG. 9. Due to stresses imposed when and after the projecting edge 151 is fixed, the gaps in the cell may be subject to errors, and the quality of images displayed by the liquid crystal display device may be lowered. The above problem can be solved by positioning a spacer underneath the projecting edge of the lower substrate so that the lower substrate has a uniform height.

Figure 10:
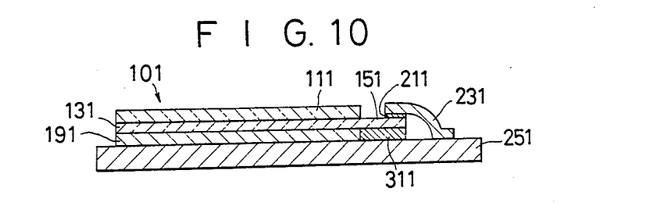
FIG. 10 is a cross-sectional view of a liquid crystal display cell of an embodiment which solves the distortion problem.

FIG. 10 shows the use of a spacer in the liquid crystal display device illustrated in FIGS. 8 and 9. Those parts of FIG. 10 which are identical to those shown in FIGS. 8 and 9 are denoted by identical reference numerals. In FIG. 10, a separate spacer 311 is disposed beneath the lower surface of the projecting edge 151 of the lower substrate 131. Therefore, even when the projecting edge 311 is pressed downwardly at the time of coupling it to the heat-sealable connector 131, the lower substrate 131 is kept at a uniform height and will not flex and not be unduly stressed.

It is preferable to apply a tacky or adhesive layer to one or both of the upper and lower surfaces of the spacer 311, so that the spacer 311 can easily be aligned in position with respect to the lower substrate 131 and the printed-circuit board 251. Where tacky or adhesive layers are applied to the upper and lower surfaces of the spacer 311, one of these layers can be used for securing the spacer 311 to the printed-circuit board 251 whereas the other can be used for securing the spacer 311 to the liquid crystal display panel 101. With this arrangement, the spacer 311 is prevented from being displaced after it has been aligned with the liquid crystal display panel 101 and the printed-circuit board 251, resulting in an increased rate of production. The tacky or adhesive layers may be formed by coating the spacer 311 with a tacky material or an adhesive.

Figure 11:
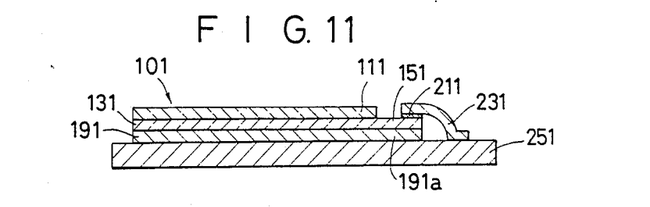
FIG. 11 is a cross-sectional view of a liquid crystal display cell of another embodiment which solves the distortion problem.

FIG. 11 shows in cross section a connecting arrangement according to another embodiment. A member 191 underneath the lower substrate, such as a reflecting plate or a polarizer, has an edge 191a extending as a spacer beneath the projecting edge 151.

By thus connecting the lower substrate to the printed-circuit board through the film connector with the spacer disposed beneath the projecting edge of the lower substrate, the lower substrate is free from undue stresses which would otherwise be caused by the connection thereof to the printed-circuit board. Consequently, the liquid crystal display panel is prevented from being deformed, and images of good quality can be displayed thereby.

Figure 12:
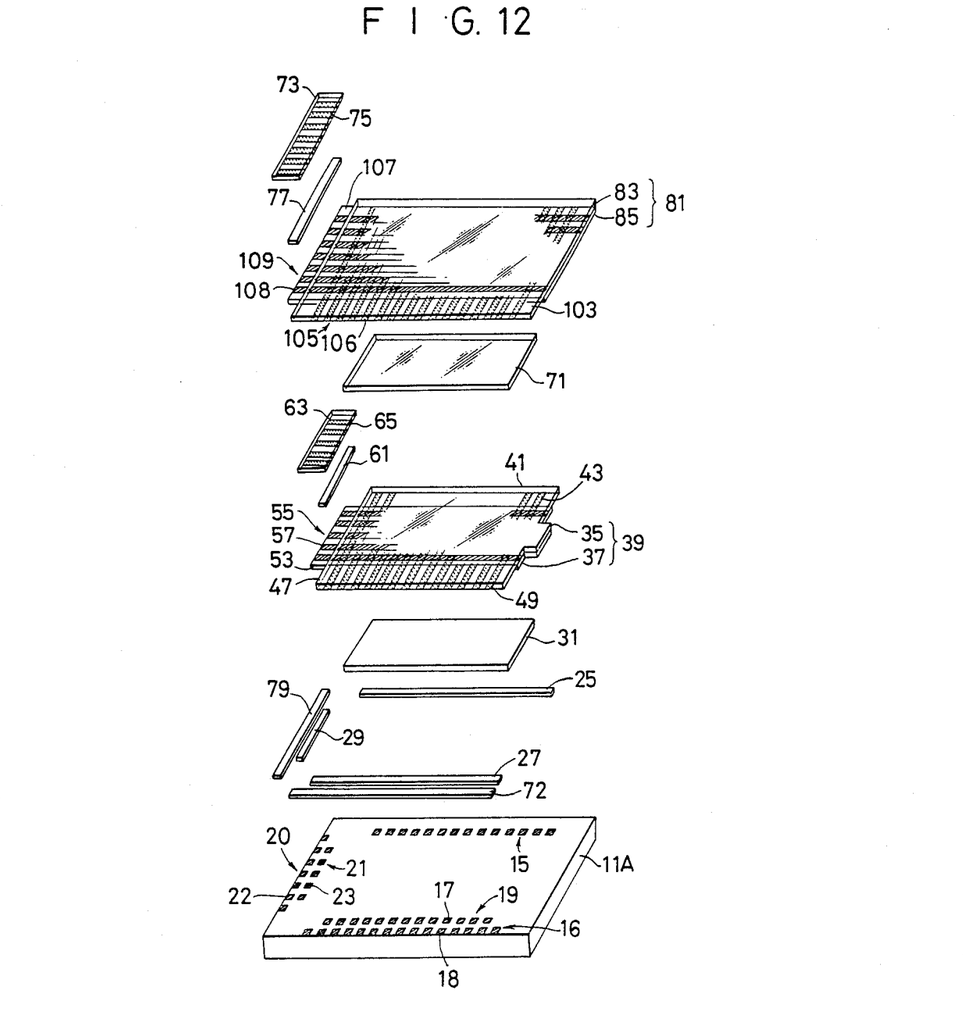
FIG. 12 is an exploded perspective view of a liquid crystal display device according to another embodiment of the present invention.

There is known a transparent touch sensor panel employed as an input device placed on a liquid crystal cell. The transparent touch sensor panel has a matrix electrode pattern comprising, for example, a substrate having stripe electrodes extending in an X direction and a substrate having stripe electrodes extending in a Y direction, the substrates being spaced from each other by a small air gap to avoid a short circuit therebetween. When the touch sensor panel is touched by a finger, for example, selected electrodes are brought into contact with each other to apply an input signal to a control circuit. The connecting arrangement using the film connector of anisotropic electric conductivity can be utilized for connecting such a touch sensor panel and a circuit board FIG. 12 shows a liquid crystal display device according to another embodiment, incorporating a touch sensor panel. The liquid crystal display device comprises a printed-circuit board 11A, a reflecting polarizer 31, a liquid crystal display cell 39, a polarizer 71, and a transparent touch sensor panel 81. The liquid crystal display cell 39 is composed of an upper substrate 35 and a lower substrate 37. The upper substrate 35 has opposite projecting edges 41, 47 including first and second signal electrode terminal sections 43, 49, respectively, on the lower surfaces thereof. The lower substrate 37 also has a projecting edge 53 including a scanning electrode terminal section 55 on the upper surface thereof. The printed-circuit board 11A has outer signal electrode terminal sections 15, 19 aligned with and connected to the first and second signal electrode terminal sections 43, 49, respectively, of the liquid crystal display cell 39 by heat-sealable film connectors 25, 27 of anisotropic electric conductivity. The printed-circuit board 11 also has an outer scanning electrode terminal section 21 aligned with and connected to the scanning electrode terminal section 55 of the liquid crystal display cell 39 by heat-sealable film connectors 29, 61 of anisotropic electric conductivity through a flexible printed substrate 63 having conductive paths 65 spaced at pitches equal to those of scanning lines.

The transparent touch sensor panel 81 includes an upper substrate 85 having electrodes extending in an X direction and a lower substrate 83 having electrodes extending in a Y direction. The upper and lower substrates 83, 85 are each formed of a flexible film such as a plastic film. The upper substrate 83 includes a projecting edge 103 with a Y-direction electrode terminal section 105 on the lower surface thereof. The lower substrate 85 also includes a projecting edge 107 with an X-direction electrode terminal section 109 on the upper surface thereof. The printed-circuit board 11A has a Y-direction outer electrode terminal section 16 aligned with and connected to the Y-direction electrode terminal section 105 of the touch sensor panel 81 by a heat-sealable film connector 72 of anisotropic electric conductivity. The printed-circuit board 11A also has an X-direction outer electrode terminal section 20 aligned with and connected to the X-direction electrode terminal section 109 of the touch sensor pane 81 by heat-sealable film connectors 77, 79 of anisotropic electric conductivity through a flexible printed-circuit board 73 having conductive paths 75 spaced at the same pitches as those of X-direction electrodes 108 of the X-direction electrode terminal section 109.

Figure 13:
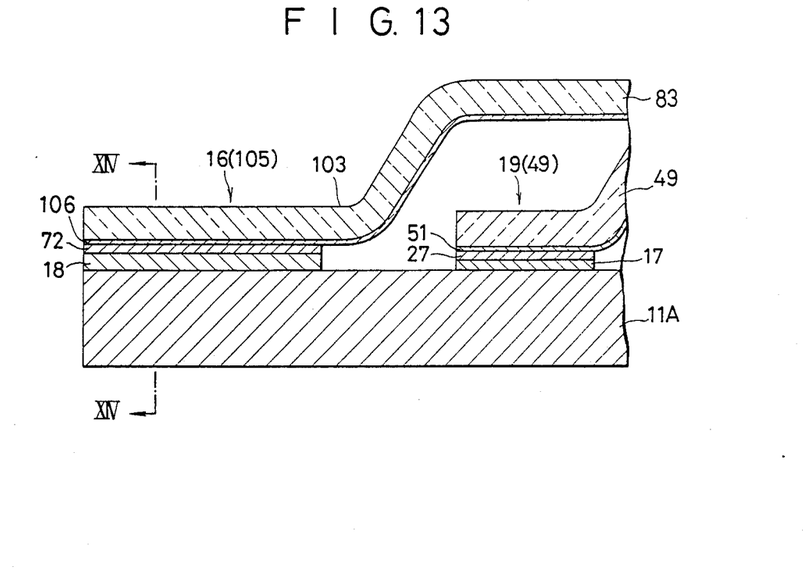
FIGS. 13 through 16 are fragmentary cross-sectional views showing the manner in which a liquid crystal display cell and a transparent touch sensor panel are connected to a circuit board.
Figure 14:
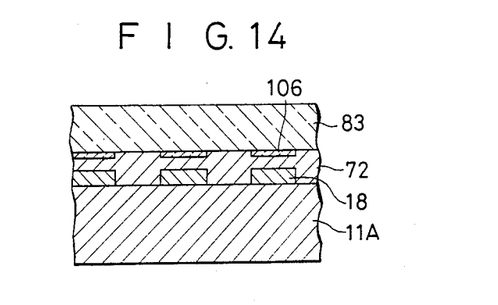

FIG. 13 shows the manner in which the second signal electrode terminal section 49 and the outer signal electrode terminal section 19 are interconnected and the Y-direction electrode terminal section 105 and the Y-direction outer electrode terminal section 16 are interconnected. FIG. 14 is a cross-sectional view taken along line XIV—XIV of FIG. 13. For assembly, the heat-sealable film connector 27 is placed on the outer signal electrode terminal section 19, and then the projecting edge 47 is placed on the film connector 27 with signal electrodes 51 of the second signal electrode terminal section 49 being aligned with outer signal electrodes 17 of the outer signal electrode terminal section 19. Then, the assembly is pressed downwardly by a heater to fix the second signal electrode terminal section 49 to the printed-circuit board 11A. Similarly, the heat-sealable film connector 72 is placed on the Y-direction outer electrode terminal section 16, and then Y-direction outer electrodes 18 of the Y-direction outer electrode terminal section 16 are placed on the film connector 72 with Y-direction terminal electrodes 106 of the Y-direction electrode terminal section 105 being aligned with the Y-direction outer electrodes 18. Then, the assembly is pressed downwardy by a heater to fix the Y-direction electrode terminal section 105 to the printed-circuit board 11A. At this time, the areas of the film connector 72 which correspond to the Y-direction outer electrodes 18 are reduced in thickness to provide electric connection between the Y-direction outer electrodes 18 and the Y-direction terminal electrodes 106. Likewise, the areas of the film connector 27 which correspond to the outer signal electrodes 17 are reduced in thickness to provide electric connection between the outer signal electrodes 17 and the signal electrodes 51. The heat-sealable film connectors 27, 72 are formed by dispersing electrically conductive particles into a film. It is anisotropic in electric conductivity since the pressed areas of reduced thickness exhibit higher electric conductivity than other areas. The resulting assembly is thin or low in profile because the films of anisotropic electric conductivity can be thinner than the lower substrate 37 and the reflecting polarizer 31. At the same time that the signal electrodes 17, 51; 18, 106 are electrically connected by the films, the liquid crystal display cell 39 and the touch sensor panel 81 are fixed to the printed-circuit board 11. As a result, the mounting operation is simplified. Inasmuch as a transparent touch sensor panel employing a flexible plastic film is light in weight, it can well be fixed in place by a heat-sealable film.

Figure 15:
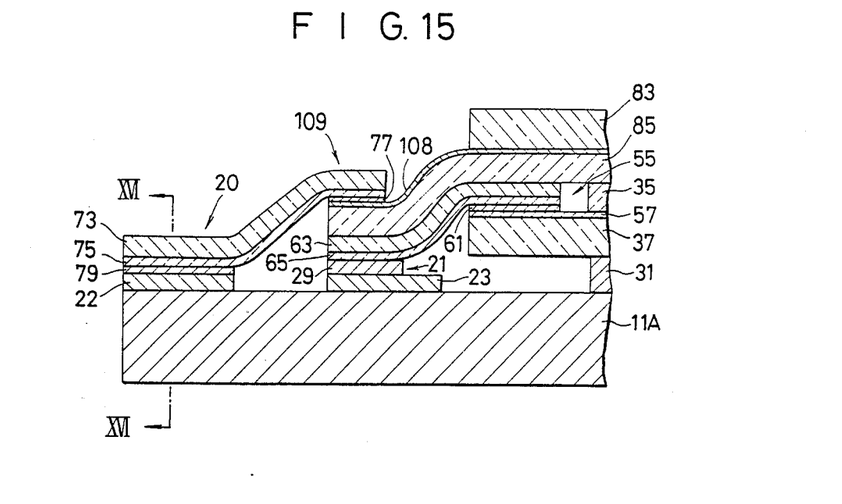
Figure 16:
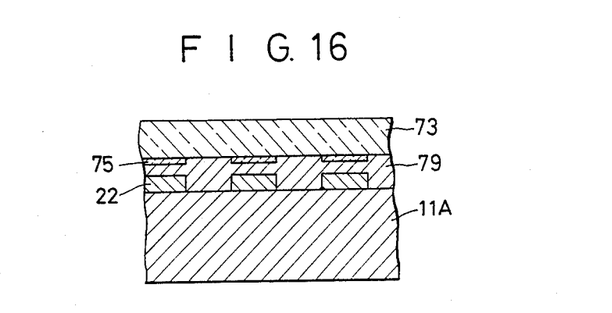

FIG. 15 shows the manner in which the scanning electrode terminal section 55 and outer scanning electrodes 23 of the outer scanning electrode terminal section 21 are interconnected and the X-direction electrode terminal section 109 and the X-direction outer electrode terminal section 20 are interconnected. FIG. 16 is a cross-sectional view taken along line XVI—XVI of FIG. 15. Scanning electrodes 57 of the scanning electrode terminal section 55 and the outer scanning electrodes 23 are interconnected by the flexible printed substrate 63 having the conductive paths 65 since they face upwardly and cannot be interconnected directly. Likewise, since the X-direction terminal electrodes 108 and X-direction outer electrodes 22 of the X-direction outer electrode terminal section 20 face upwardly, they are interconnected by a flexible printed substrate 73 having conductive paths 75 spaced at the same pitches as those of the X-direction terminal electrodes 108, through the film connectors 77, 79. The flexible printed substrate 73 and the X-direction electrode terminal section 109, the flexible printed substrate 73 and the X-direction outer electrode terminal section 20, the flexible printed substrate 63 and the scanning electrode terminal section 55, and the flexible printed substrate 63 and the outer scanning electrode section 21 are interconnected in the same manner as described above with reference to FIGS. 13 and 14. The film connectors serve to electrically connect the transparent touch sensor panel 81 to the printed-circuit board 11A and also to mechanically secure the transparent touch sensor panel 81 to the printed-circuit board 11A. Furthermore, the film connectors serve to electrically connect the liquid crystal cell 39 to the printed-circuit board 11A and also to mechanically secure the liquid crystal cell 39 to the printed-circuit board 11A. The surface of the outer scanning electrode section 21 and the surface of the scanning electrode terminal section 55 are at different levels because of the thicknesses of the substrate 37 and the polarizer 31 placed below the scanning electrode terminal section 55. However, these surfaces are reliably interconnected by the flexible printed substrate 63.

Figure 17:
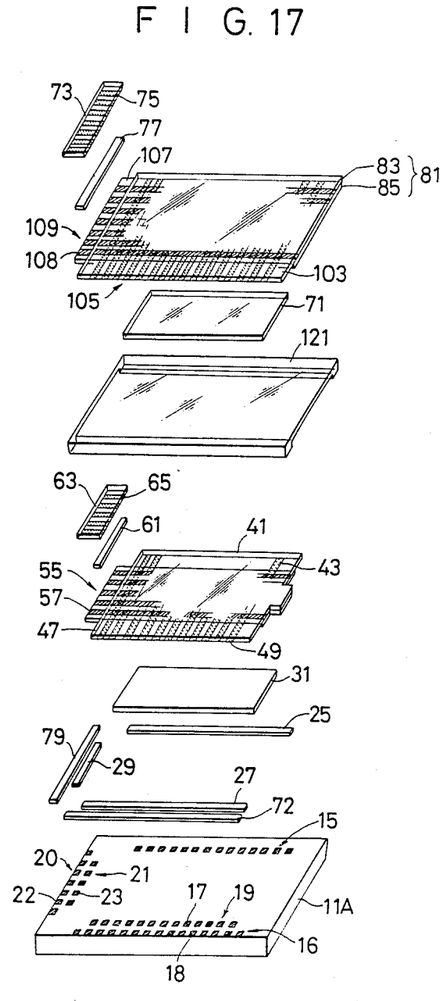
FIG. 17 is an exploded perspective view of a liquid crystal display device according to still another embodiment of the present invention.

FIG. 17 illustrates a liquid crystal display device according to still another embodiment of the present invention. This liquid crystal display device is substantially the same as the liquid crystal display device of FIG. 12 except that a protective panel 121 is interposed between the liquid crystal display cell 39 and the transparent touch sensor panel 81. In the embodiment of FIG. 12, only the polarizer 71 is disposed between the transparent touch sensor panel 81 and the liquid crystal display cell 39. Since the polarizer is normally formed of a flexible material, when the transparent touch sensor panel 81 is pushed by a finger, the liquid crystal cell 39 is subjected to localized pressure which tends to damage the orientation film or the gap in the liquid crystal cell 39, impairing the quality of displayed images. According to the embodiment of FIG. 17, the protective panel 121 is spaced from the liquid crystal cell 39 to prevent the same from being subjected to localized pressure. The protective panel 171 is preferably made of a rigid material such as acrylic sheet. The protective panel 171 is fixed in place by screws or bonding or other suitable means. The protective panel 171 may be placed over the polarizer 71. The polarizer 71 may be dispensed with if a protective panel having a polarizing capability is employed.

A protective panel or another sheet having a protecting ability may be used as the lower substrate of the transparent touch sensor panel 81.

Figure 18:
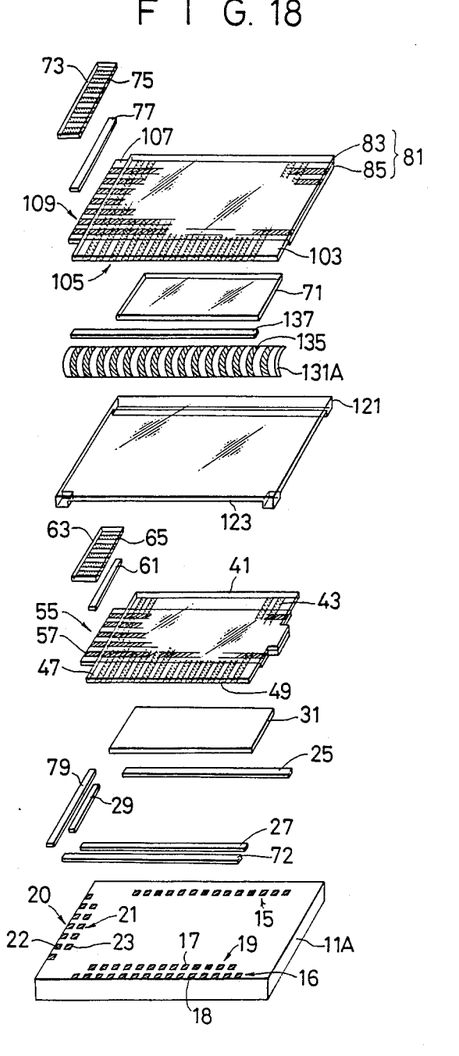
FIG. 18 is an exploded perspective view of a liquid crystal display device according to a still further embodiment of the present invention.

FIG. 18 shows a liquid crystal display device according to a still further embodiment of the present invention. The liquid crystal display device illustrated in FIG. 18 differs from that shown in FIG. 17 in that a protective panel 121 has a recess or gap 123 defined in a side edge corresponding to the Y-direction outer electrode terminal section 16 of the printed-circuit board 11A, and that the Y-direction outer electrode terminal section 16 is connected to the Y-direction electrode terminal section 105 of the transparent touch sensor panel 81 by a curved flexible printed substrate 131 having conductive paths 135 spaced at the same pitches as those of the electrodes of the Y-direction electrode terminal section 105. The flexible printed substrate 131, and the Y-direction electrode terminal section 105 and the Y-direction outer electrode terminal section 16 are interconnected by respective film connectors 137, 72 of anisotropic electric conductivity. With the embodiment of FIG. 18, the projecting edge 103 of the transparent touch sensor 81 can be coupled to the printed-circuit board 11A without being flexed downwardly, so that the transparent touch sensor panel 81 can be mounted in place without being curved under the influence of the protective panel 121 which is relatively thick.

The transparent touch sensor panel is thus securely coupled to the flexible-film liquid crystal display cell by the film connectors of anisotropic electric conductivity. The transparent touch sensor panel can therefore be connected electrically and mechanically to the liquid crystal display cell simply and inexpensively in a low-profile construction.

Although certain preferred embodiments have been shown and described, it should be understood that many changes and modifications may be made therein without departing from the scope of the appended claims.

What is claimed as new and desired to be secured by Letters Patent of the United States is:

1. A liquid crystal display device comprising:
    a circuit board having an outer electrode terminal section for a signal wire;
    a liquid crystal display cell including a flexible film used as an upper substrate and a lower substrate and having an electrode terminal section for a signal wire; and
    said upper substrate having projecting edges extending beyond corresponding edges of said lower substrate, and said electrode terminal section formed on the lower side of the upper substrate of the liquid crystal cell and said outer electrode terminal section of the circuit board being connected by a film connector of anisotropic conductivity and a flexible printed circuit substrate by applying heat and pressure thereto, so that said electrode terminal section and said outer electrode terminal section are interconnected and said liquid crystal cell is secured to said circuit board.

* * * * *